Figure 1A:
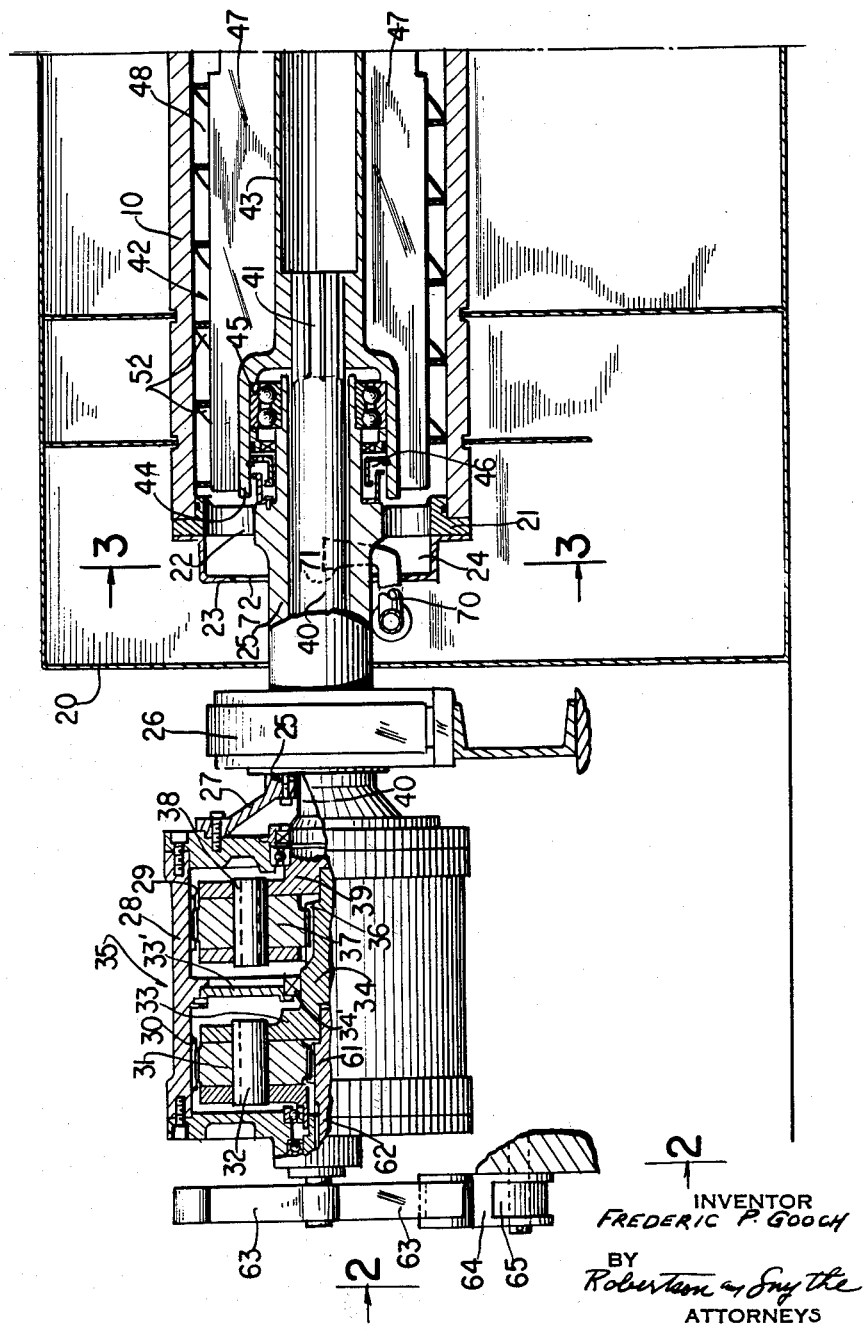

June 8, 1965 F. P. GOOCH 3,187,997
HORIZONTAL TYPE CENTRIFUGAL SEPARATOR
Filed Feb. 12, 1962 3 Sheets-Sheet 1

INVENTOR
FREDERIC P. GOOCH
BY
Robertson & Smythe
ATTORNEYS

June 8, 1965　　　F. P. GOOCH　　　3,187,997
HORIZONTAL TYPE CENTRIFUGAL SEPARATOR
Filed Feb. 12, 1962　　　3 Sheets-Sheet 2
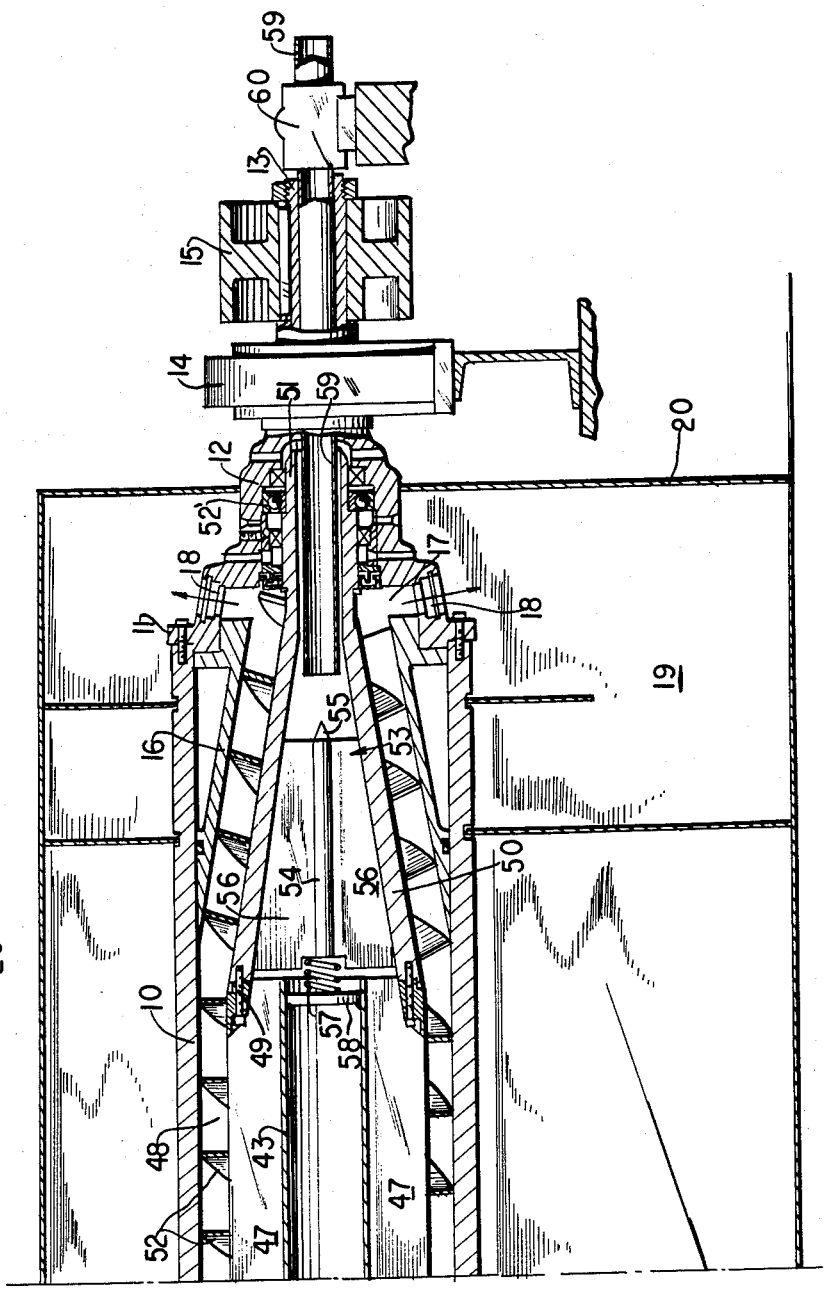
INVENTOR
FREDERIC P. GOOCH
BY
Robertson ay Smythe
ATTORNEYS June 8, 1965 F. P. GOOCH 3,187,997
HORIZONTAL TYPE CENTRIFUGAL SEPARATOR
Filed Feb. 12, 1962 3 Sheets-Sheet 3
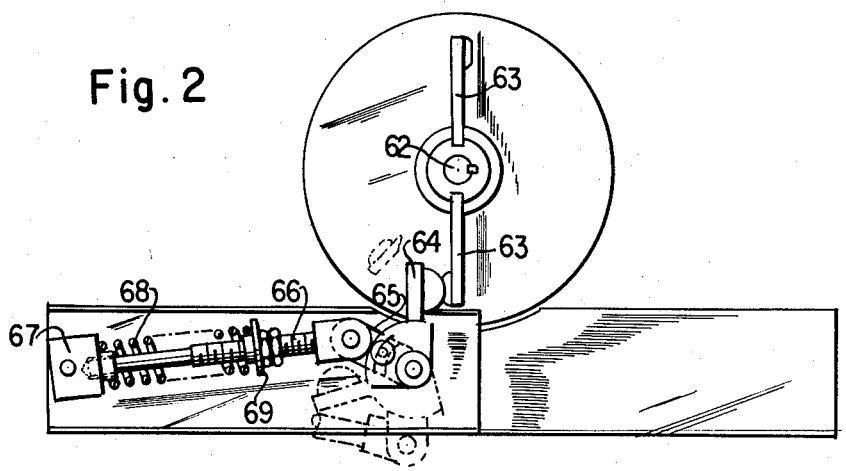
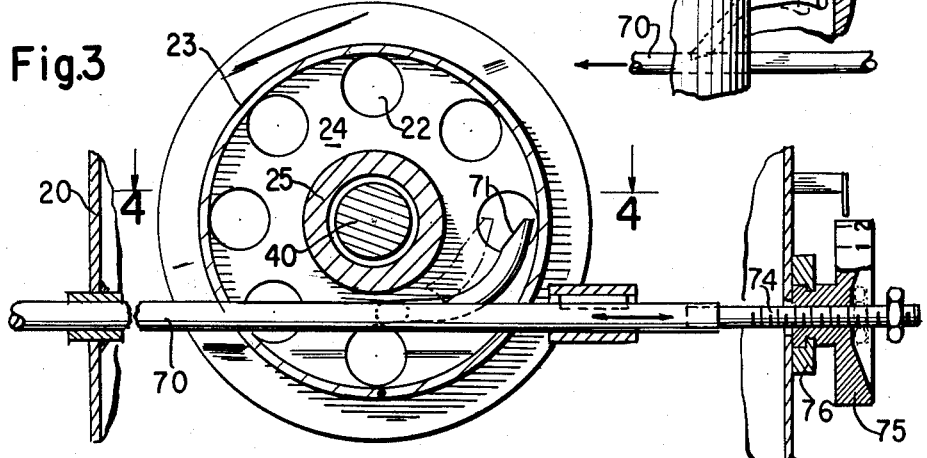
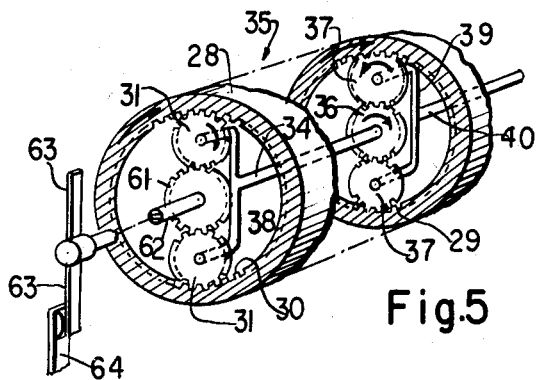
INVENTOR
FREDERIC P. GOOCH
BY
Robertson and Smythe
ATTORNEYS ively driving the drum through the end plate. United States Patent Office 3,187,997
Patented June 8, 1965

3,187,997
HORIZONTAL TYPE CENTRIFUGAL SEPARATOR
Frederic P. Gooch, North Miami Beach, Fla., assignor to Ametek, Inc., New York, N.Y., a corporation of Delaware
Filed Feb. 12, 1962, Ser. No. 172,605
1 Claim. (Cl. 233—7)

The present invention relates to centrifugal separators, and particularly to a new and improved continuously fed centrifugal separator for treating a mixture of solids and liquid.

Problems arise in the operation of such separators, particularly in the separation of solids from slurries having a relatively low solids content. Additionally, in prior known separators of this type, the slurry often is caused to churn as it is brought up to the bowl speed, causing the solids to become more difficult to separate and thus reducing the efficiency of the operation.

In conventional centrifuges of this type, at certain pond depths the incoming slurry or feed is directed onto collected solids near the beach, causing them to remix and be carried out with the effluent.

Prior known separators of this type usually have a constant "pond" depth, and those capable of adjustment usually require stopping the operation and opening of the separator housing to make a desired adjustment to vary the pond depth. Furthermore, these prior known separators are generally provided with a restricted exit area causing a high velocity at these points and a tendency to remix and carry away previously settled solids.

The principal object of this invention is to provide a continuously fed centrifugal separator that will overcome the above as well as other disadvantages of known separators of this type.

Another object of the invention is to provide such a separator in which slurries having a relatively low solids content can be efficiently treated to separate the solids and liquid.

Still another object of the invention is to provide such a separator having a two-stage planetary gear drive in which each stage is separately lubricated.

Another object of the invention is to provide such a separator in which the incoming slurry is prevented from churning as the bowl is increased to efficient operating speed.

Another object of the invention is to provide such a separator in which the incoming slurry is prevented from being washed away with the effluent.

Still another object of the invention is to provide such a separator in which the separated solids are inhibited from contacting the stream of slurry.

Another object of the invention is to provide such a separator in which a skimmer tube may be employed for withdrawing the effluent and which tube can be adjusted while the separator is in operation.

Still another object of the invention is to provide such a separator having a large liquid exit area to prevent any solids from resettling in the effluent.

In one aspect of the invention and in the preferred form, a relatively long, horizontally disposed drum may have a so-called "dry" end plate fixed to one end including an elongated hollow shaft extending therefrom and which shaft is journaled within a bearing. The outer end of the plate shaft may have a pulley fixed to it for rotatively driving the drum through the end plate. The drum may have a so-called "wet" plate fixed to its other end including an elongated, hollow shaft extending outwardly from it and journaled in a bearing aligned with the bearing journaling the hollow plate shaft fixed to the opposite end of the drum. A relatively long, hollow beach control insert generally of truncated conical form may be located within the drum at the "dry" end thereof, and forms with the "dry" end plate a chamber having radial ports for the discharge of solids separated from the slurry.

In another aspect of the invention, the hollow shaft extending from the "wet" end plate may be connected to a rotatable reactor having internal gear teeth of a multi-stage planetary gearing box. The sun gear of the first stage of the planetary may be releasably fixed by an overload linkage, and the planet carrier of said first stage may be connected to the sun gear of the second stage planetary stage. The planet carrier of the second stage may be fixed to a shaft extending through the hollow "wet" plate shaft, and it may be splined to a tubular shaft extending substantially throughout the length of the drum. Radially extending vanes may be fixed to the outer periphery of the tubular shaft, and a scroll is fixed to the outer edges of said vanes.

In another aspect of the invention, an annular member may be attached to the ends of the radial vanes near the "dry" end plate and it may be fixed to a hollow, conical member terminating in a hollow shaft that is journaled in a bearing within a housing forming part of the "dry" end plate.

In still another aspect of the invention, a non-rotatable inlet or feeding tube may extend through the hollow shaft of the "dry" end plate and the hollow shaft of the conical member, terminating at the entrance to the throat formed by the hollow conical member, which throat has a progressively increasing cross-sectional dimension in the direction of slurry flow to the drum. Within the conical member may be located tapered accelerating vanes fixed to a shaft having a pointed end that is spaced from, but aligned with, the feeding tube. The accelerating vane assembly may be resiliently urged into the conical member such that the exterior of its vanes frictionally engages the inner surface of, and cooperates with, driving lugs located in the hollow conical member.

In still another aspect of the invention, the "wet" end plate may be provided with effluent discharge ports leading into a chamber fixed to the "wet" end plate, and into which a skimmer tube may extend for receiving the exhausting effluent. The skimmer tube may be supported by a threaded, non-rotatable shaft that extends to the exterior of a housing surrounding the rotatable drum, and a rotatable handwheel may be threaded onto the threaded shaft for adjusting the skimmer tube location, thereby to vary the pond depth while the drum is rotating.

The above, other objects and novel features of the invention will become apparent from the following specification and accompanying drawings which are merely exemplary.

In the drawings:
FIGS. 1A and 1B are sectional elevational views of a centrifugal separator to which the principles of the invention have been applied;
FIG. 2 is a sectional elevational view taken substantially along line 2—2 of FIG. 1A;
FIG. 3 is a sectional elevational view taken substantially along line 3—3 of FIG. 1A;
FIG. 4 is a partial sectional plan view taken substantially along line 4—4 of FIG. 3; and
FIG. 5 is a perspective schematic view of the arrangement of the planetary gearing within the gear box of FIG. 1A.

Referring to the drawings, and particularly to FIGS. 1A and 1B, the principles of the invention are shown as applied to a centrifugal separator including a hollow drum 10 having a so-called "dry" end plate 11 fixed to its one end. The plate 11 may include a housing portion 12 and a hollow shaft 13 that is journaled in a bearing 14. The shaft 13 may support a pulley 15 for driving the drum 10. A hollow insert 16 of generally truncated conical form may be fixedly mounted within the drum 10, and one end thereof may form with a portion of the plate 11 a collecting chamber 17 for receiving the separated solids. Radial ports 18 within a portion of the end plate 11 may pass the collected solids from the chamber 17 to a chamber 19 within a housing 20 surrounding the drum 10.

The end of drum 10 opposite that supporting end plate 11 may support a so-called "wet" end plate 21 having effluent discharge ports 22 therein, and a housing 23 fixed to plate 21 forms a liquid collecting chamber 24. The end plate 21 may include a hollow shaft 25 extending axially therefrom and in alignment with hollow shaft 13. Shaft 25 may be journaled in and extend beyond a bearing 26 similar to bearing 14.

The shaft 25 may support a disk 27 that is fixed to a hollow, cylindrical housing 28 having internal gears 29 and 30. The internal gear 30 meshes with planet gears 31 journaled on pins 32 mounted in an arm 33 that is fixed to a shaft 34, forming a first planetary stage of a gear reducing unit 35. The shaft 34 may support sun gear teeth 36 of a second planetary stage of unit 35. Sun gear teeth 36 mesh with planet gears 37 which latter also mesh with the internal gear 29. The planet gears 37 are journaled on pins 38 mounted in an arm 39 including a shaft 40 that extends into the drum 10 and has a splined end 41. A dividing plate 33' may be located between the first and second stages of the planetary gearing, and seals 34' may be provided between plate 33' and shaft 34 so that each stage may be lubricated by separate lubricants. This makes possible the use of a lubricant suited for the speed of the gears in each section.

A conveyor 42 may be mounted within drum 10, and it may include a tubular element 43 having a bell end 44 journaled on antifriction bearings 45 on the end of shaft 25 opposite that connected to housing 28. A liquid seal 46 may be provided to prevent the effluent from entering bearing 45.

Vanes 47 may be equally spaced about, extend radially from and spirally along, and fixed to the outer periphery of the tubular element 43. They may be of less height than the pond depth so as to provide an annular space 48 between their outer edges and the inner periphery of the drum 10, and to permit clarified liquid to pass over the top of the vanes without disturbing previously settled solids. For high solids content, the height of the spiral vane means 47 may be higher than the pond depth so that the slurry flow along a spiral path. An annular member 49 may surround and be connected to the vanes 47 at their ends adjacent the "dry" end plate 11, and a hollow conical member 50 may have its base portion fixed to member 49. The conical member 50 may include a hollow shaft extension 51 that is journaled in a bearing 52' located within housing portion 12 of end plate 11.

A strip 52 may spirally surround the outer edges of the vanes 47 and the conical member 50, forming flights of the conveyor assembly, and the spiralling may be such that the separated solids from the slurry are moved toward the "dry" end plate 11.

An accelerating vaned member 53 may be located within the conical member 50. It may comprise a rod 54 having a pointed end 55 and radially extending, tapered accelerating vanes 56 equally spaced about and fixed to rod 54. The accelerating vaned member 53 may be resiliently urged toward end plate 11 by a spring 57 that reacts against a disk 58 within tubular member 43.

A feed tube 59 may be non-rotatably supported by a fixture 60, and its longitudinal axis may be aligned with the pointed end of the rod 54.

Referring to FIGS. 1A and 5, the planet gears 31 mesh with a sun gear 61 integral with a shaft 62. An arm 63 is fixed to shaft 62 and its ends are in position to abut a lever 64 of a bell crank arrangement. The other arm 65 of the bell crank is pivoted to an end of a threaded rod 66, the opposite end of which is mounted in a pivotal element 67. A compression spring 68 surrounds shaft 66 and is located between a threaded collar 69 and the element 67. This linkage provides an overload release that normally maintains the sun gear 61 stationary.

Referring to FIGS. 1A, 3 and 4, removal of the effluent collecting in chamber 24 is preferably effected by a skimmer tube 70. Tube 70 may extend transversely through a wall of housing 20 and it may include a skimmer nozzle 71 that passes through an opening 72 in housing 23. The tube 70 may be fixed to a non-rotatable threaded shaft 74 that extends to the exterior of housing 20. A handwheel 75 may be threaded onto shaft 74 and be held against axial movement by a yoke member 76 fixed to housing 20. Accordingly, rotating handwheel 75 adjusts the position of the nozzle 71 of skimmer tube 70 relative to the inner periphery of the housing 23.

Rotation of the pulley 15 rotates drum 10, and with it the housing 28 of gear box 35, in a clockwise direction (FIG. 5). The critical speed of shaft 13 should preferably be above the running speed of the bowl 10 in order to prevent vibrations causing whipping of the inlet tube 59 which might cause it to break. This is avoided by making shaft 13 of short length. Since sun gear 61 is normally held against rotation, shaft 34 rotates in a clockwise direction. This causes shaft 40 also to rotate clockwise, but at a reduced rate compared with the rotation of drum 10, and depending upon the gear ratios of the planetary gearing within gear box 35. Accordingly, conveyor 42 rotates in the same direction as drum 10 but at a lower speed.

As slurry is continuously fed through the tube 59, it is caused to move horizontally, to spread, and to be equally divided among accelerating blades 56. Its rotary speed is caused to increase as it passes through the throat of the conical member 50 so that it is substantially at the rotary speed of the liquid within the pond extending throughout the length of drum 10 when it reaches said pond. This prevents turbulence in the pond as the slurry reaches it, and also prevents slurry from contacting dry solids on the beach.

The blades 47 cause centrifugal separation of the solids from the slurry, the solids moving radially to the annular space 48 and the liquid remaining radially inward therefrom. The flights 52 of the conveyor move the solids toward the "dry" end plate 11 and they are discharged through the ports 18 into chamber 19 of housing 20. The liquid continues to move toward the "wet" end plate 21, discharging through ports 22 into chamber 24 where the nozzle 71 of skimmer tube 70 exhausts such liquid.

Should the apparatus become overloaded, the arm 63 trips bell crank 64, 65 to its dotted line position (FIG. 2), thereby permitting rotation of sun gear 61 and interrupting the rotation of conveyor 42 until the overload is reduced.

Although the various features of the new and improved centrifugal separator have been shown and described in detail to fully disclose one embodiment of the invention, it will be evident that changes may be made in such details and certain features may be used without others without departing from the principles of the invention.

What is claimed is:

In a horizontal type centrifugal separator, a drum mounted for rotation about a substantially horizontal axis; a separator-conveyor assembly within said drum including means forming with said drum a solids chamber and a liquid pond, said separator-conveyor assembly including a shaft with radial vane means extending axially throughout a major portion of said drum, and having one longitudinal edge integral with said shaft; a strip spirally wound about the other longitudinal edge of said radial vanes forming flights of a screw conveyor; means for rotating said drum and separator-conveyor assembly at different speeds; means for feeding slurry continuously to, and axially of, said drum at one end thereof; means for imparting a speed of rotary motion to said slurry substantially equal to that within the pond prior to said slurry reaching said pond, said means comprising a hollow elongated conical member intermediate said radial vane means and said means for feeding slurry, said conical member having radial vanes extending throughout a major portion of its length and also from its longitudinal axis to the inner surface of said conical member; a liquid collecting chamber at the end of said drum opposite that to which slurry is fed; a skimmer tube having a nozzle within said liquid collecting chamber; a housing surrounding said drum; and means located exteriorly of said housing for adjusting the position of said skimmer tube nozzle while said drum and separator-conveyor are rotating.

References Cited by the Examiner

UNITED STATES PATENTS

| | | | |
|---|---|---|---|
| 873,593 | 12/07 | Phillips | 233—7 |
| 884,830 | 4/08 | Lindahl. | |
| 1,027,134 | 5/12 | Leitch | 233—7 X |
| 1,572,299 | 2/26 | McEntire | 233—7 |
| 2,106,964 | 2/38 | Wells | 233—22 X |
| 2,108,098 | 2/38 | Bergner | 233—45 |
| 2,243,697 | 5/41 | Forsberg | 233—45 |
| 2,578,456 | 12/51 | Smith | 233—7 |
| 2,600,372 | 6/52 | Milliken et al. | 233—7 |
| 2,622,794 | 12/52 | Smith | 233—7 |
| 2,649,816 | 8/53 | Kuster et al. | 233—7 X |
| 2,703,676 | 3/55 | Gooch | 233—23 X |
| 2,733,856 | 2/56 | Kjellgren | 233—7 |
| 2,740,580 | 4/56 | Schmiedel | 233—7 |
| 2,743,865 | 5/56 | Graae | 233—7 |

FOREIGN PATENTS 687,712  4/30  France.

HARRY B. THORNTON, *Primary Examiner.*

HERBERT L. MARTIN, ROBERT F. BURNETT,
*Examiners.*